Aug. 17, 1926.

F. A. THOMAS

SPARK ARRESTER

Filed July 6, 1925

Frank A. Thomas
INVENTOR

BY *Victor J. Evans*
ATTORNEY

WITNESS: *Gerald Henner Jr.*

Aug. 17, 1926.

F. A. THOMAS 1,596,778

SPARK ARRESTER

Filed July 6, 1925

Frank A. Thomas
INVENTOR

BY Victor J. Evans
ATTORNEY

WITNESS: Gerald Hennessy

Patented Aug. 17, 1926.

1,596,778

UNITED STATES PATENT OFFICE.

FRANK AUGUSTA THOMAS, OF FOSTORIA, TEXAS.

SPARK ARRESTER.

Application filed July 6, 1925. Serial No. 41,802.

This invention comprehends the provision of a spark arrester capable of being conveniently associated with a smoke stack to prevent the escape of sparks therefrom which frequently cause fire damage to adjacent property, the invention residing in the construction, combination and arrangement of parts as claimed.

In the drawings forming part of this application, like numerals of reference indicate similar parts in the several views, and wherein.

Figure 1:
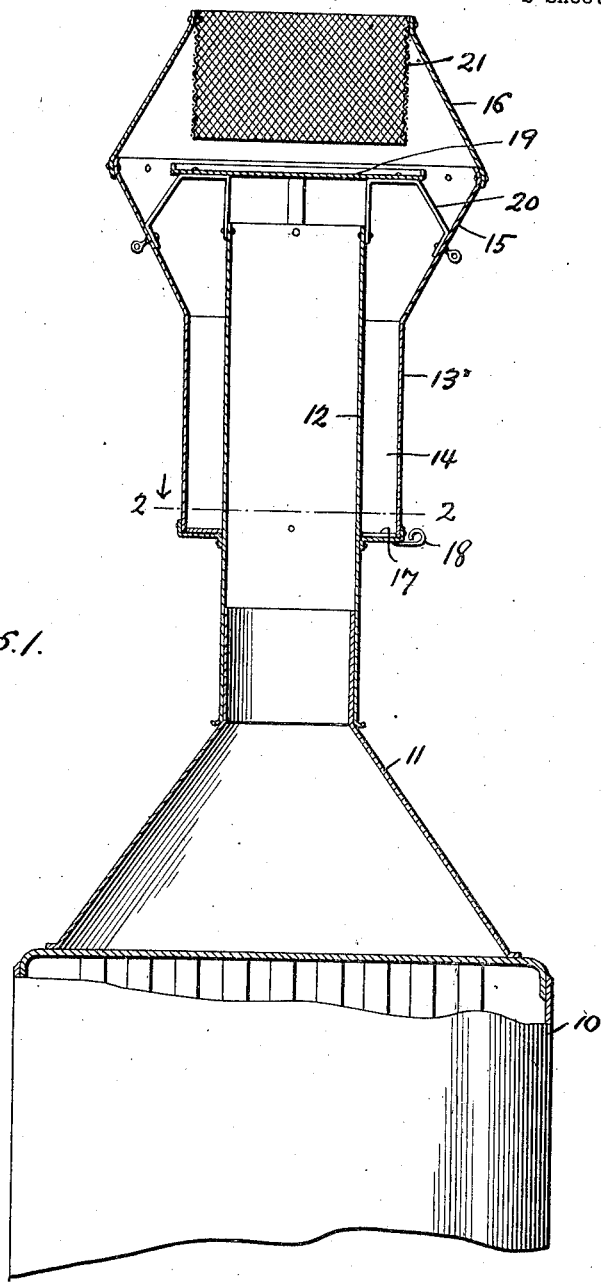
Figure 1 is a vertical sectional view through the invention.
Figure 2:
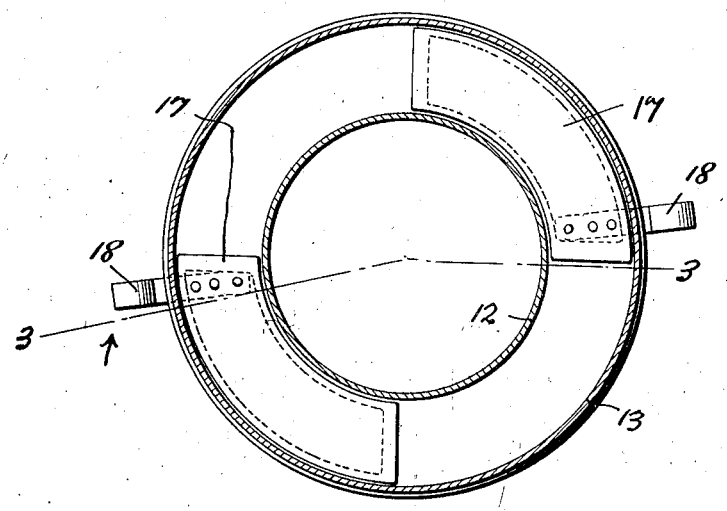
Figure 2 is a transverse sectional view on line 2—2 of Figure 1.
Figure 3:
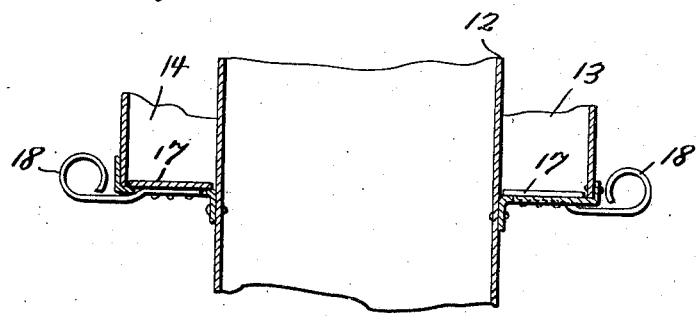
Figure 3 is a sectional view on line 3—3 of Figure 2.

Referring to the drawings in detail, 10 represents a boiler upon which is supported a smoke stack 11, with which the invention is shown associated.

The invention comprises spaced inner and outer members 12 and 13 respectively which define a chamber 14 in which the sparks from the stack 11 are arrested, the inner member 12 projecting an appreciable distance beneath the outer member 13 and adapted to be slipped over the smoke stack 11, forming a continuity of the latter. The outer member 13 is enlarged adjacent its upper end, including reversely disposed angular portions 15 and 16 respectively, this member projecting an appreciable distance above the upper end of the member 12 as shown. The device in its entirety is open at its upper end, while slides 17 are used to normally close the lower end of the chamber 14, and opened to clean out the chamber 14 as the occasion may require. Each slide is provided with a handle 18 by means of which it can be conveniently operated. Arranged within the outer member 13 and directly above the inner member 12 is a baffle plate 19 supported upon the member 12 and also upon the member 13 by angularly shaped brackets 20 clearly illustrated in Figure 1. The baffle plate 19 is of greater diameter than the inner member 12, so that the sparks admitted from said inner member 12 cannot pass beyond the plate 19, striking this plate and being directed into the chamber 14 as will be readily understood. The smoke however passes around the baffle plate into the enlarged upper portion of the member 13 and ultimately finds its way to the atmosphere, through an annular member of foraminated material indicated at 21 and suspended from the upper end of the outer member 13.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A spark arrester comprising spaced inner and outer members defining a chamber open at its upper end, slides normally closing the lower end thereof, said inner member projecting beneath the outer member and adapted to be associated with a smoke stack forming a continuity thereof, said outer member being enlarged at its upper end and projecting above the adjacent end of said inner member, a baffle plate, inverted substantially U-shaped brackets supporting said baffle plate and having corresponding limbs secured to the inner member and their other limbs secured to said outer member, said baffle plate being spaced above the inner member and having a larger diameter than that of said inner member, and an annular member of foraminated material suspended from the outer member and terminating in close proximity to said baffle plate.

In testimony whereof I affix my signature.

FRANK AUGUSTA THOMAS.